(12) United States Patent
Iwabuchi (10) Patent No.: US 7,209,208 B2
(45) Date of Patent: Apr. 24, 2007

(54) MANUFACTURING METHOD OF DISPLAY DEVICE

(75) Inventor: Tomoyuki Iwabuchi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 123 days.

(21) Appl. No.: 10/721,470

(22) Filed: Nov. 26, 2003

(65) Prior Publication Data

US 2004/0125310 A1     Jul. 1, 2004

(30) Foreign Application Priority Data

Dec. 27, 2002   (JP)   ............... 2002-379496

(51) Int. Cl.
  *G02F 1/1345*  (2006.01)
  *G02F 1/13*    (2006.01)

(52) U.S. Cl. .................. 349/149; 349/187; 349/192

(58) Field of Classification Search ........ 349/149–152, 349/187, 192
See application file for complete search history.

(56) References Cited

U.S. PATENT DOCUMENTS

| 5,437,946 A | 8/1995 | McCoy ..................... 430/5 |
| 5,811,211 A | 9/1998 | Tanaka et al. ............... 430/30 |
| 5,824,235 A | 10/1998 | Yamazaki et al. ............ 216/23 |
| 5,938,942 A | 8/1999 | Yamazaki et al. ............ 216/23 |
| 5,995,199 A | 11/1999 | Shinozaki et al. ........... 355/53 |
| 6,010,384 A * | 1/2000 | Nishino et al. .............. 445/24 |
| 6,023,310 A * | 2/2000 | Kawamoto et al. .......... 349/54 |
| 6,097,361 A | 8/2000 | Rohner ....................... 345/87 |
| 6,204,912 B1 | 3/2001 | Tsuchiya et al. ............. 355/53 |
| 6,346,979 B1 | 2/2002 | Ausschnitt et al. .......... 355/53 |
| 6,512,572 B1 | 1/2003 | Morioka ..................... 355/53 |

* cited by examiner

*Primary Examiner*—Dung T. Nguyen
(74) *Attorney, Agent, or Firm*—Nixon Peabody LLP; Jeffrey L. Costellia

(57) ABSTRACT

A manufacturing method of a display device, which prevents electrostatic breakdown of the display device both before and after a circuit test without reducing the productivity in forming a plurality of display devices on a substrate to be processed by a step-and-repeat exposing method. A wiring pattern group led out from signal input terminals of the display devices to the edge of the substrate to be processed is efficiently formed by exposing to light through a repetitive pattern integrated with a display device pattern. Depending on the states of the wiring pattern group as to contact or non-contact with a detachable and conductive component, the signal input terminals of the display devices can be easily switched between in a short circuited state and a non-short circuited state. Accordingly, both the measure against electrostatic breakdown and the circuit test are achieved in the display devices on the substrate to be processed.

10 Claims, 12 Drawing Sheets

FIG. 1A

—Prior Art—

FIG. 1B

—Prior Art—

FIG. 2A

—Prior Art—

FIG. 2B

—Prior Art—

FIG. 3A

—Prior Art—

FIG. 3B

—Prior Art—

FIG. 4A

—Prior Art—

FIG. 4B

—Prior Art—

FIG. 5A

—Prior Art—

FIG. 5B

—Prior Art—

FIG. 6

-Prior Art-

FIG. 7A

—Prior Art—

FIG. 7B

—Prior Art—

FIG. 8A

—Prior Art—

FIG. 8B

—Prior Art—

-Prior Art-

FIG. 12

-Prior Art-

MANUFACTURING METHOD OF DISPLAY DEVICE

BACKGROUND OF THE INVENTION

1. Field of the Invention

The present invention relates to an active matrix display device using thin film transistors (TFTs) and a manufacturing method thereof. In particular, the present invention relates to a method of preventing breakdown of an element due to static electricity and plasma discharge generated in processes and after a test operation.

2. Description of the Related Art

Recently, an active matrix display device in which a peripheral circuit is integrally formed on a substrate has been developed. The active matrix display device is a semiconductor device having a structure in which an active matrix circuit including a display portion formed of a TFT and a peripheral circuit formed also of a TFT are integrally formed on a substrate.

With respect to the manufacture, substrates to be processed have been enlarged for improvement of productivity, and a glass substrate sized 600×720 mm is mainly used in recent years. Enlargement of substrates is considered to be further developed in future. The number of display devices fabricated from one substrate is increased (multiple pattern technology) by the enlargement of substrates to be processed, and the productivity is thus significantly enhanced.

Figure 12:
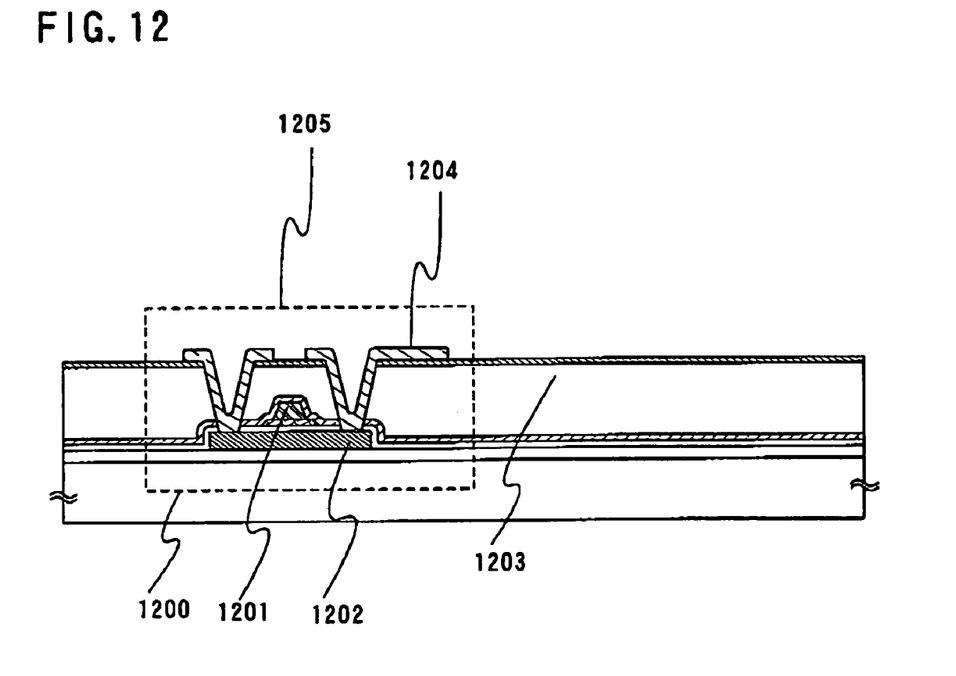
FIG. 12 is a cross sectional view of a TFT.

FIG. 12 is an example of a cross sectional view of the TFT. As shown in the figure, a circuit formed of the TFT has a laminated structure. The laminated structure of the circuit can be obtained by sequentially performing the deposition of each layer over a substrate to be processed and forming of desired circuit patterns.

A circuit pattern of each layer is generally formed by photolithography. In performing photolithography, a circuit pattern is exposed to a photo resist deposited on each layer, by irradiating light to the photo resist through a reticle including the circuit pattern. Then, an etching process is performed using the obtained resist film as a protective film to form the circuit pattern.

Figure 11:
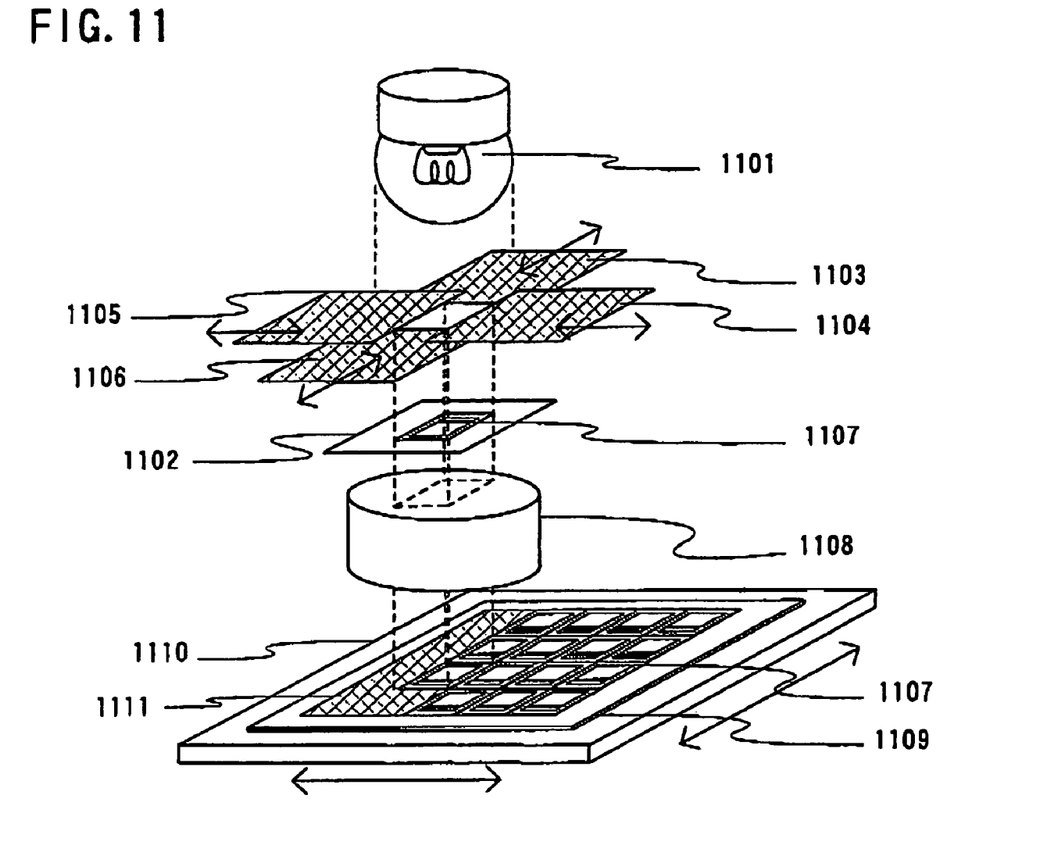
FIG. 11 is a view of an exposure system for sequentially exposing a substrate to be processed through a regular pattern.

A step-and-repeat exposure is one of the methods used for forming a plurality of circuits having the same shape and size on one large scale substrate to be processed. FIG. 11 shows a schematic view of an exposure system for performing the step-and-repeat exposure. The exposure system includes a light source 1101 for exposing, blinds 1103 to 1106 for selecting an exposed region over a reticle by partially blocking a light from the light source, a reticle 1102, a projection lens 1108 for projecting a pattern, and a movable stage 1110 for moving a substrate to be processed 1109.

In the step-and-repeat exposing method, the exposure of the photo resist 1111 which is performed in photolithography through the reticle including a circuit pattern, and the moving of the substrate to be processed 1109 are alternately repeated. The photo resist on the substrate to be processed can thus be exposed to light to form a plurality of circuit patterns having the same shape and size.

Figure 1A:
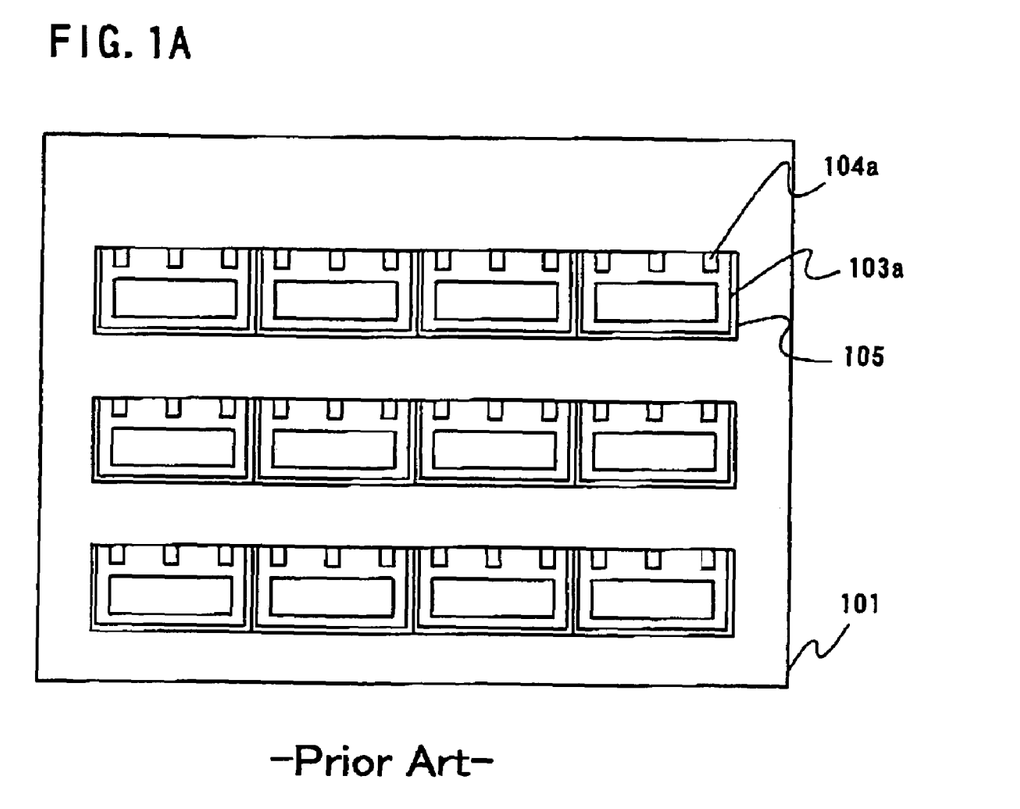
FIGS. 1A and 1B are views showing a process of sequentially exposing a substrate to be processed through a regular pattern.
Figure 1B:
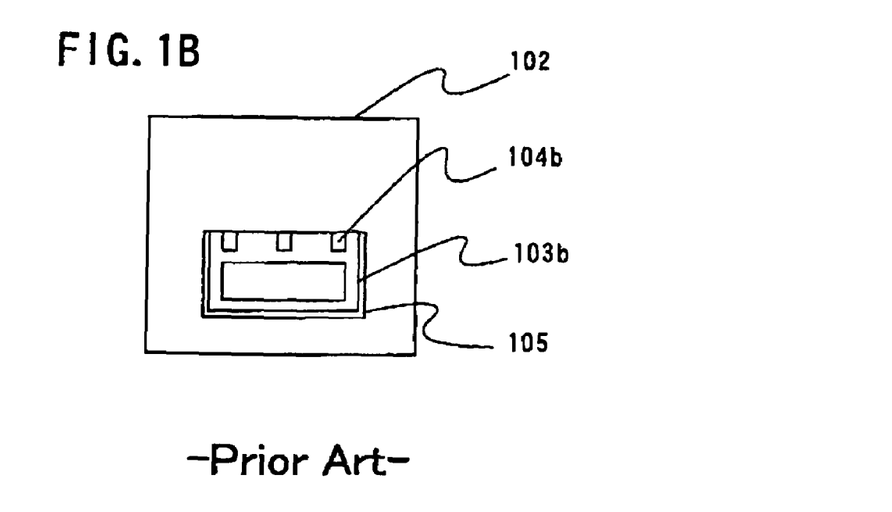

In such a manner, the exposure is sequentially performed through an exposure unit Dis 105 formed on a reticle 102 and including a display device pattern 103b and a signal input terminal pattern 104b as shown in FIG. 1B. Accordingly, a plurality of display devices 103a and signal input terminals 104a can be formed on the substrate to be processed as shown in FIG. 1A.

That is, a circuit pattern of each layer for forming a circuit is formed on the reticle and the substrate to be processed is sequentially exposed to light for each layer. Accordingly, a plurality of desired circuits can be formed by using a small number of reticles, and the production cost of circuits can be reduced.

In the step-and-repeat exposing method, time required for processing a series of exposure becomes generally shorter in accordance with the reduction in the number of exposure. Further, the exposure time becomes shorter in accordance with the reduction in the number of reticles used for the exposure, because the reticles need not be changed many times. In addition, the production cost of reticles can be reduced in accordance with the reduction in the number of reticles used for the exposure.

In manufacturing a display device, forming of a pattern other than the display device is occasionally required to take a measure against static electricity, to perform a test process more efficiently and the like.

Figure 2A:
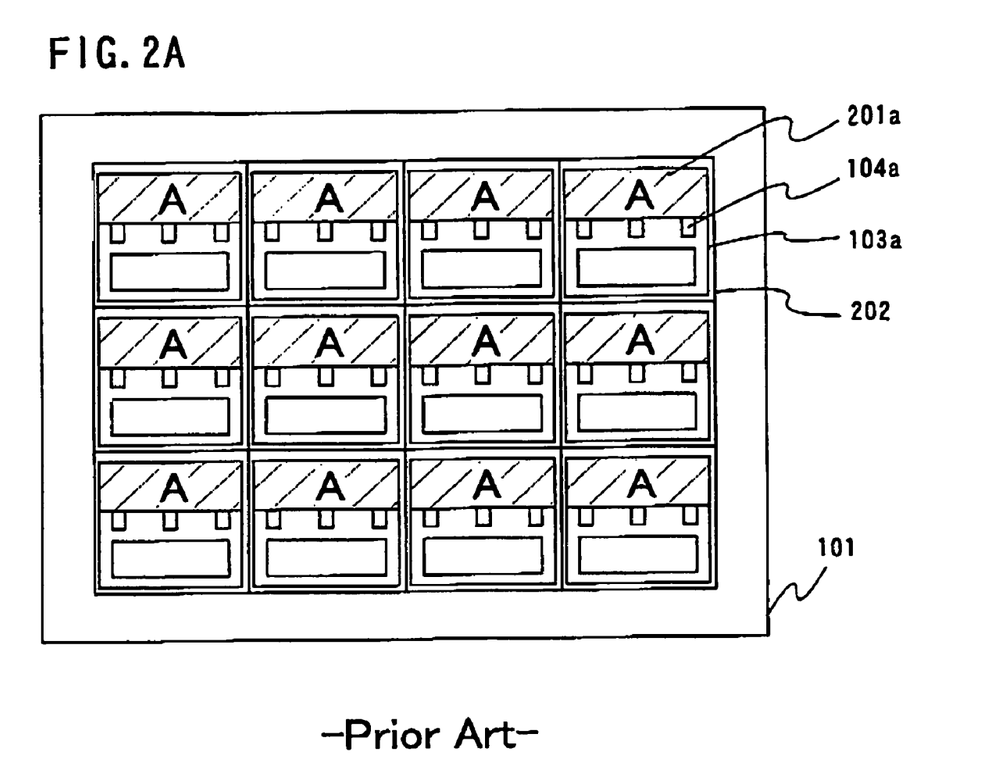
FIGS. 2A and 2B are views showing a process of sequentially exposing a substrate to be processed through a regular pattern.

For example, as shown in FIG. 2A, a substrate to be processed 101 may be sequentially exposed to light through not only a display device 103a and a signal input terminal 104a but also a circuit group (hereinafter referred to as a pattern A) 201a utilized for the measure against static electricity and for the test process.

Figure 2B:
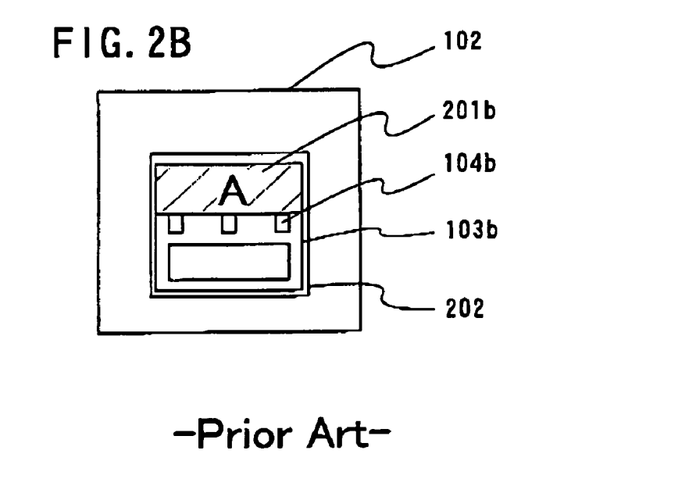

In this case, the exposure can be sequentially performed by integrally forming a display device pattern 103b, a signal input terminal pattern 104b, and a pattern A 201b on the reticle 102 to form these patterns simultaneously as shown in FIG. 2B. By using this method, even when patterns other than the display device are formed on the reticle, the exposure time is not prolonged, that is, productivity is not reduced.

Figure 3A:
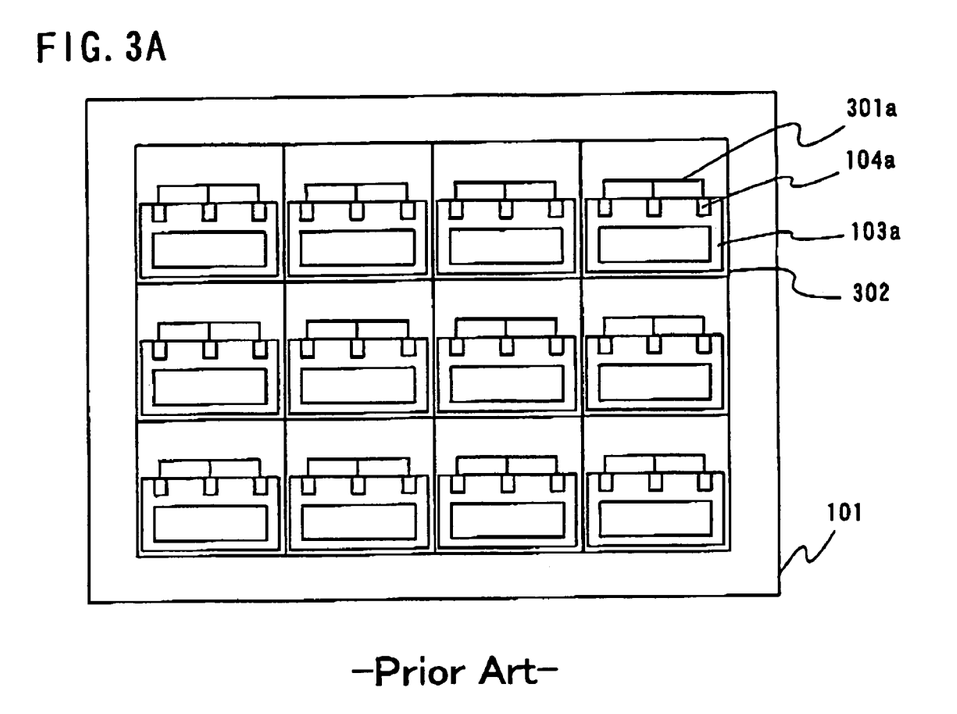
FIGS. 3A and 3B are views showing a process of sequentially exposing a substrate to be processed through a regular pattern.
Figure 3B:
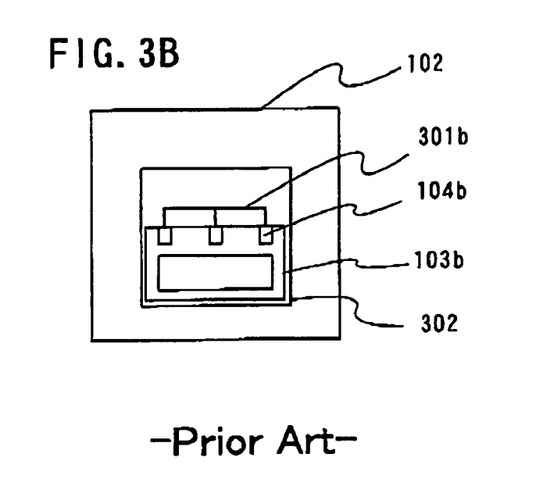

FIGS. 3A and 3B show an example of the above-described case, that is, the case where patterns other than the display device are formed on a reticle. As shown in FIG. 3A, a plurality of display devices 103a, signal input terminals 104a, and wirings for short circuit S 301a are formed on the substrate to be processed 101. The wirings for short circuit S 301a are formed by sequentially exposing the substrate to be processed 101 to light through an exposure unit Dis+S 302 formed on the reticle 102 and including a wiring pattern for short circuit S 301b and the display device pattern 103b as shown in FIG. 3B. Therefore, the wirings for short circuit S 301a can be obtained without reducing the productivity of the display device itself.

When using a glass substrate or a quartz substrate as a substrate to be processed, insulating property on the surface of the substrate becomes high. Accordingly, in the process of plasma CVD film forming, sputtering, and dry etching or the like, electrostatic breakdown is observed. Electrostatic breakdown is a phenomenon in which elements are broken due to the potential difference generated by the charged electrostatic load on the wire free of short circuits. Electrostatic breakdown may also occur by electrostatic generated in an alignment or a transport of the substrate.

As a measure against such electrostatic breakdown, the signal input terminals are conventionally short circuited to each other in processes to prevent the potential difference due to the charged electrostatic load from being easily generated. The wirings for short circuit S 301a, which are formed so that the signal input lines of the display devices are directly short circuited to each other as shown in FIG. 3, are generally removed in a process of separating the display devices on the substrate to be processed into individual devices.

Figure 4A:
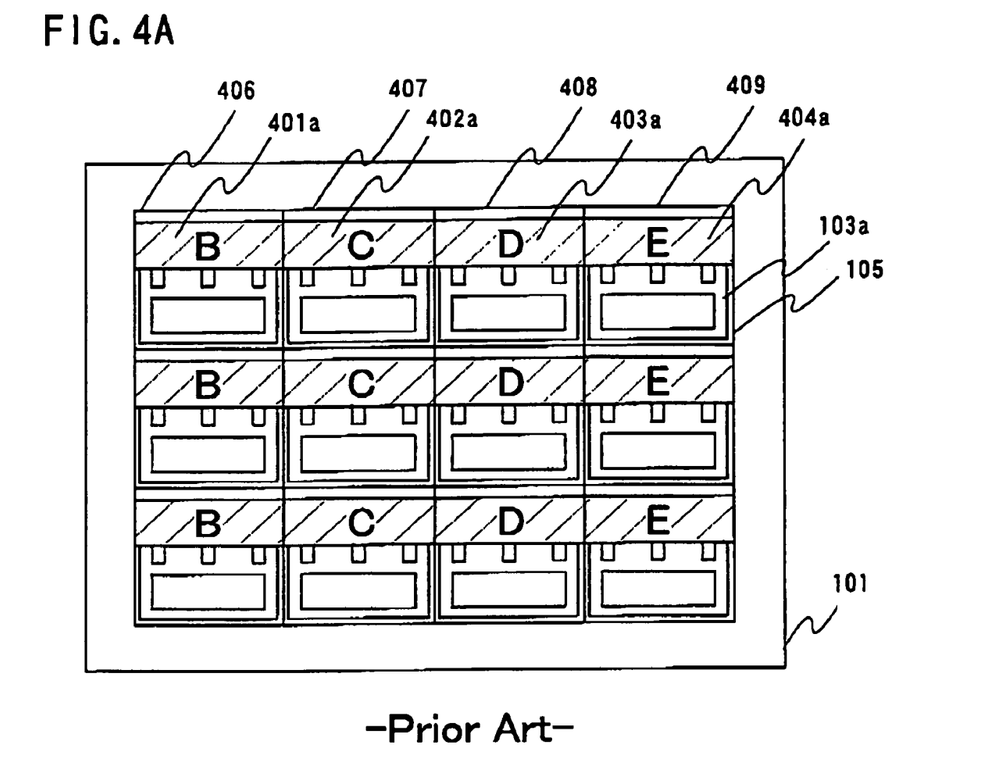
FIGS. 4A and 4B are views showing a process of sequentially exposing a substrate to be processed through a pattern including an irregular region.

On the other hand, when there are a plurality of patterns other than the display device pattern, e. g., a pattern B 401*a*, a pattern C 402*a*, a pattern D 403*a*, and a pattern E 404*a* as shown in FIG. 4A, these patterns can be repeated without integrating with the display device 103*a*. In such a case, two exposure methods described below are performed.

Figure 4B:
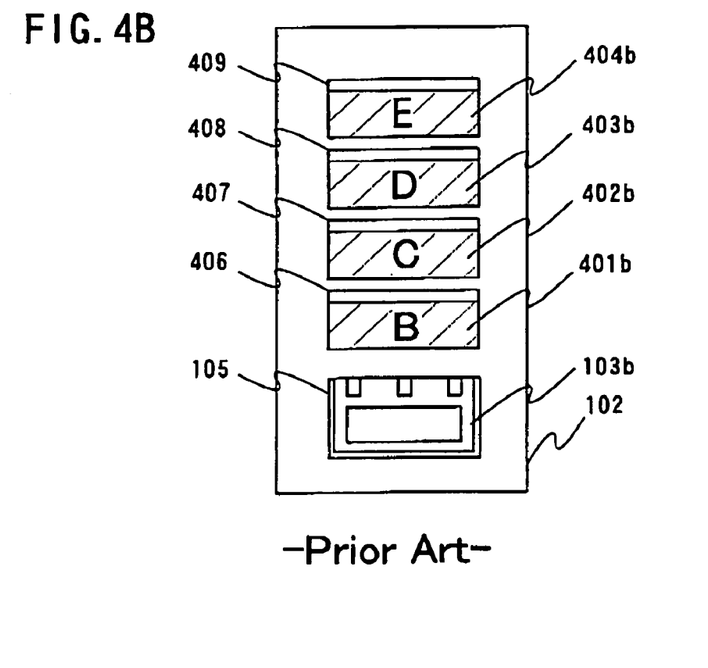

In a first exposure method, provided on a reticle are individual exposure units: the exposure unit Dis 105, an exposure unit B 406, an exposure unit C 407, an exposure unit D 408, and an exposure unit E 409 in which the display device pattern 103*b*, the pattern B 401*b*, the pattern C 402*b*, the pattern D 403*b*, and the pattern E 404*b* are respectively formed as shown in FIG. 4B.

Figure 5A:
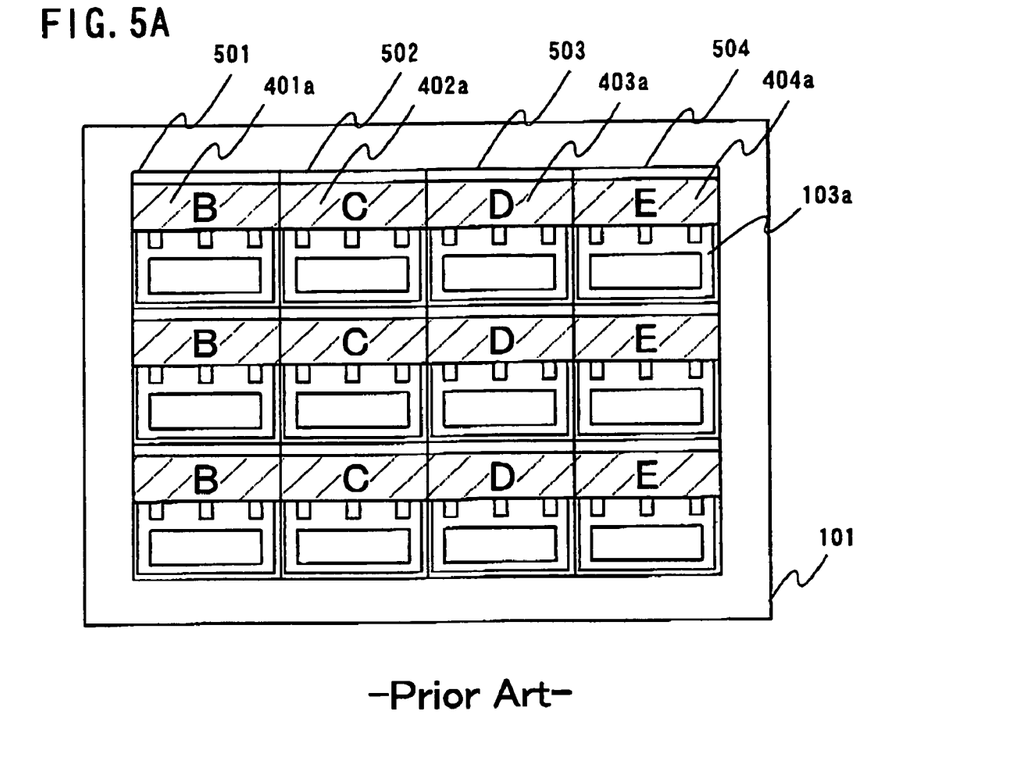
FIGS. 5A and 5B are views showing a process of sequentially exposing a substrate to be processed through a pattern including an irregular region.
Figure 5B:
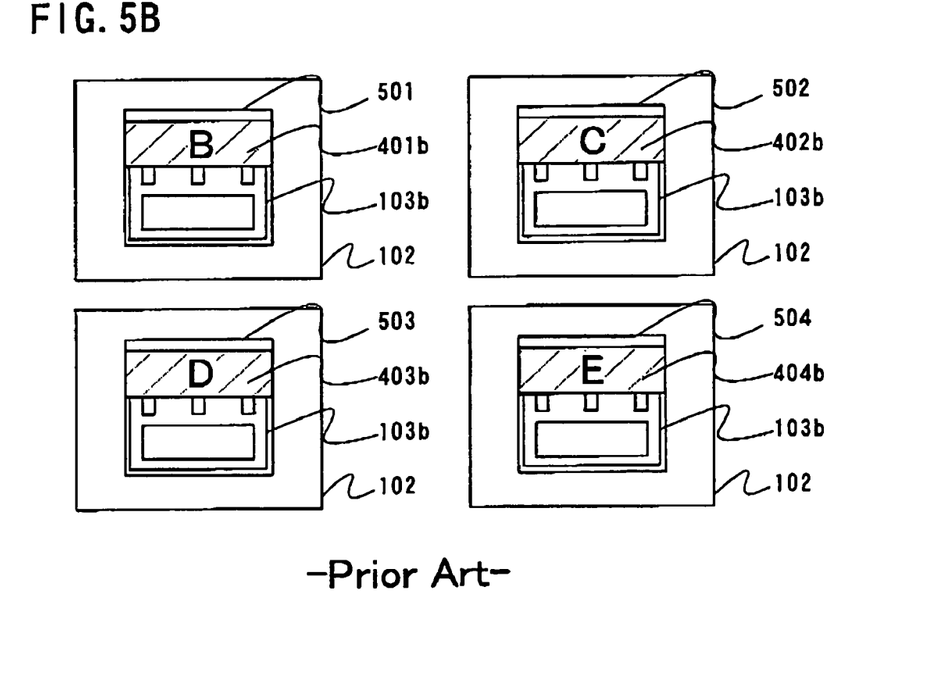

In a second exposure method, the same pattern as FIG. 4A is formed on the substrate to be processed 101 by using a plurality of reticles 102 having different structures as shown in FIG. 5A. Specifically, provided on each reticle are an exposure unit Dis+B 501, an exposure unit Dis+C 502, an exposure unit Dis+D 503, and an exposure unit Dis+E 504 in which the pattern B 401*b*, the pattern C 402*b*, the pattern D 403*b*, and the pattern E 404*b* are respectively formed in combination with the display device pattern 103*b*.

In the first exposure method as shown in FIG. 4B, not only the exposure of the exposure unit Dis 105 including only the display device pattern 103*b* but also the exposure of other exposure units (the exposure unit B 406, the exposure unit C 407, the exposure unit D 408, and the exposure unit E 409) is required. Therefore, the exposure time is prolonged.

In the second exposure method, the number of reticles is increased. Therefore, both the exposure time and the production cost of reticles are increased.

Accordingly, in the case of taking a measure against static electricity and performing a test process more efficiently by using an irregular pattern as compared to the device pattern, the productivity is deteriorated in both the first and second methods.

In addition, in a process of separating the display devices into individual devices to achieve the manufacture thereof, after forming a plurality of display devices on a large scale substrate to be processed, circuit tests are required to see whether each display device operates normally. Each circuit has to be independent at this time because the circuit test is performed in the process. Accordingly, the wirings for short circuit S 301*a* described above need to be cut off before the circuit test.

That is, the wirings for short circuit S 301*a* no longer operate in processes after the circuit test. It was thus a problem that the conventional wirings for short circuit S 301*a* could not prevent the breakdown of elements due to electrostatic generated after the circuit test.

It is preferable that there is no short circuit between signal input terminals in the circuit test, and they are short circuited in other processes, in transporting the substrate or the like.

In the process of cutting wires for short circuit before the test, the amount of time required for cutting wires may be shortened by putting together a plurality of cut sections of the wires for short circuit. The cut section is preferably placed on the edge of a substrate for minimizing the effect of particles from the cut section on the display device. In such a case, the wiring pattern needs to be led out from the input terminal to the edge of a substrate to be processed.

Figure 6:
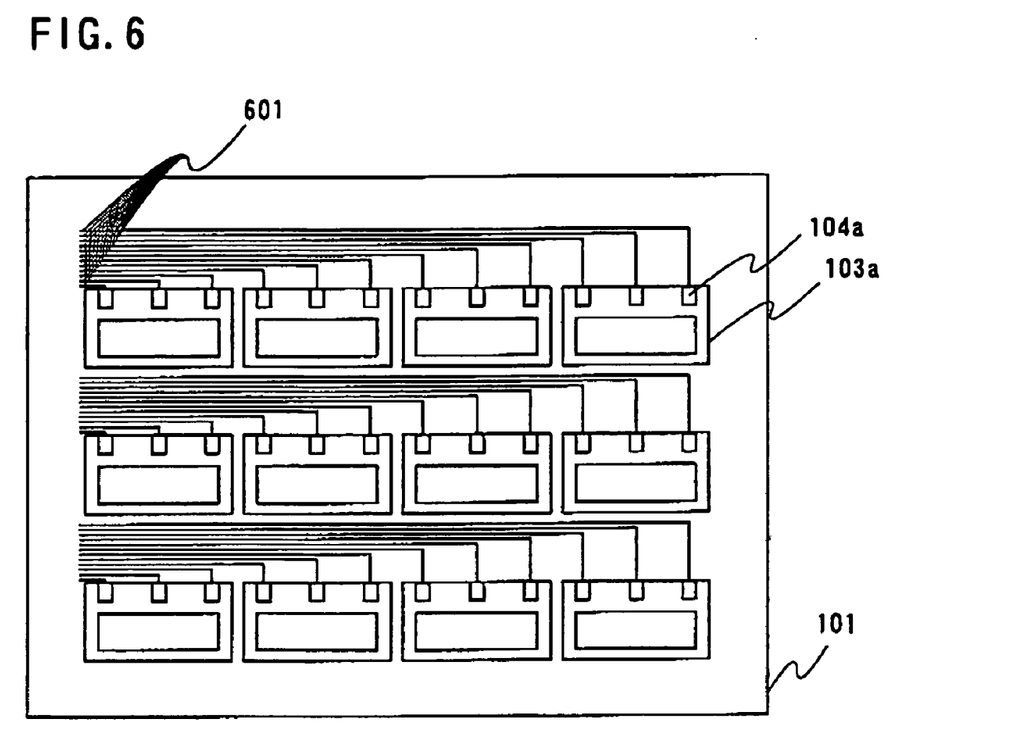
FIG. 6 is a view showing a process of sequentially exposing a substrate to be processed through a pattern including an irregular region.

However, as shown in FIG. 6, a lead-out wiring 601 which is led out from each input terminal to the edge of a substrate to be processed is arranged irregularly as compared to the display device 103*a*. The two methods described above must thus be used for forming the lead-out wiring 601.

Figure 7A:
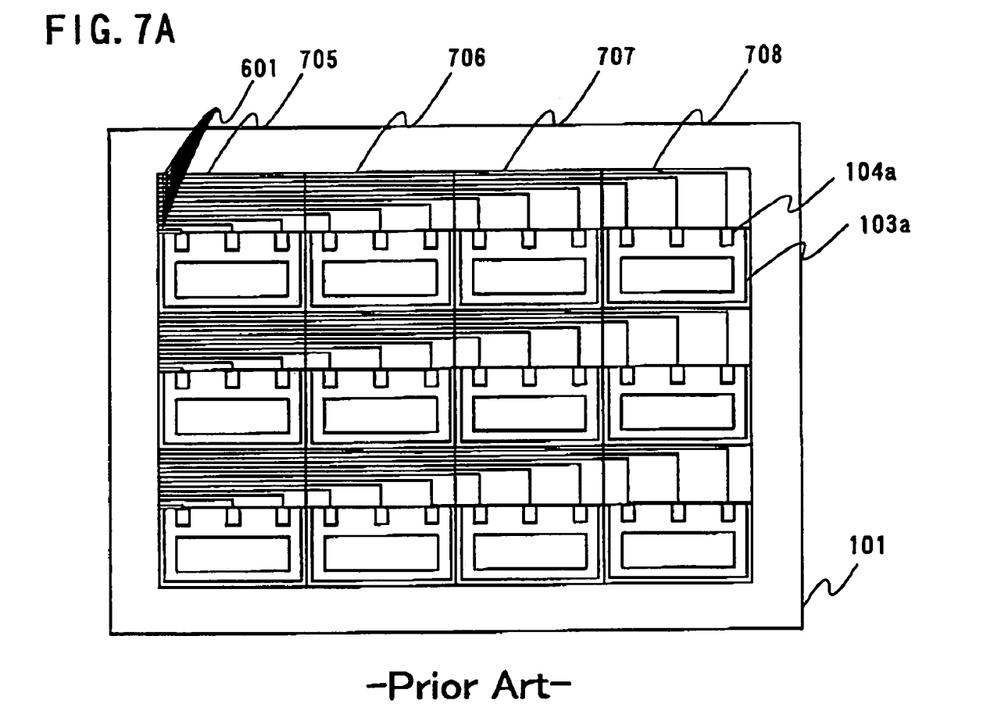
FIGS. 7A and 7B are views showing a process of sequentially exposing a substrate to be processed through a pattern including an irregular region.
Figure 7B:
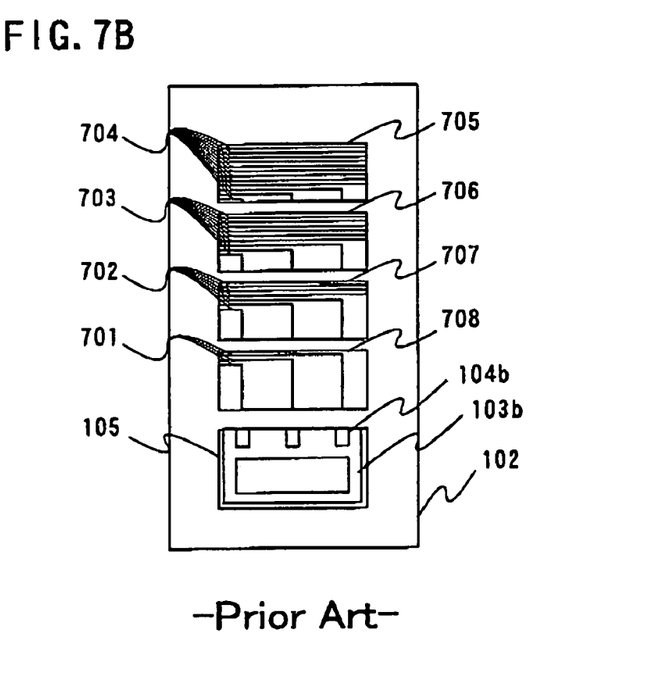

An exposure pattern as shown in FIG. 7A can be obtained according to the first exposure method. Specifically, the exposure pattern is sequentially exposed to light through a reticle provided with the exposure unit Dis 105, an exposure unit BB 705, an exposure unit BC 706, an exposure unit BD 707, and an exposure unit BE 708 including the display device pattern 103*b*, a divided wiring pattern BB 701, a divided wiring pattern BC 702, a divided wiring pattern BD 703, and a divided wiring pattern BE 704 respectively as shown in FIG. 7B. Note that these divided wiring patterns are obtained by dividing the lead-out wiring 601.

Figure 8A:
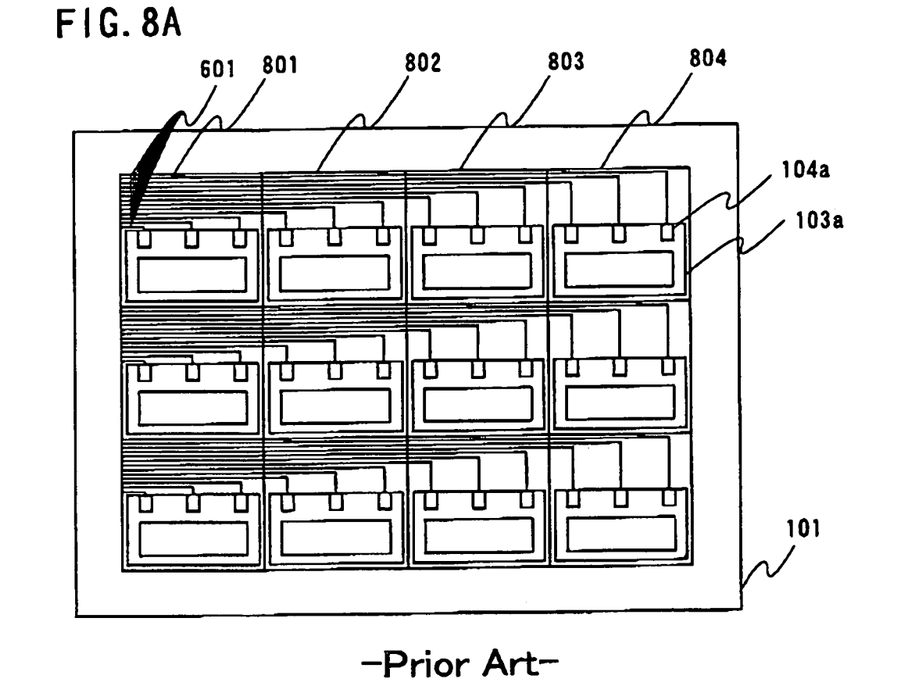
FIGS. 8A and 8B are views showing a process of sequentially exposing a substrate to be processed through a pattern including an irregular region.
Figure 8B:
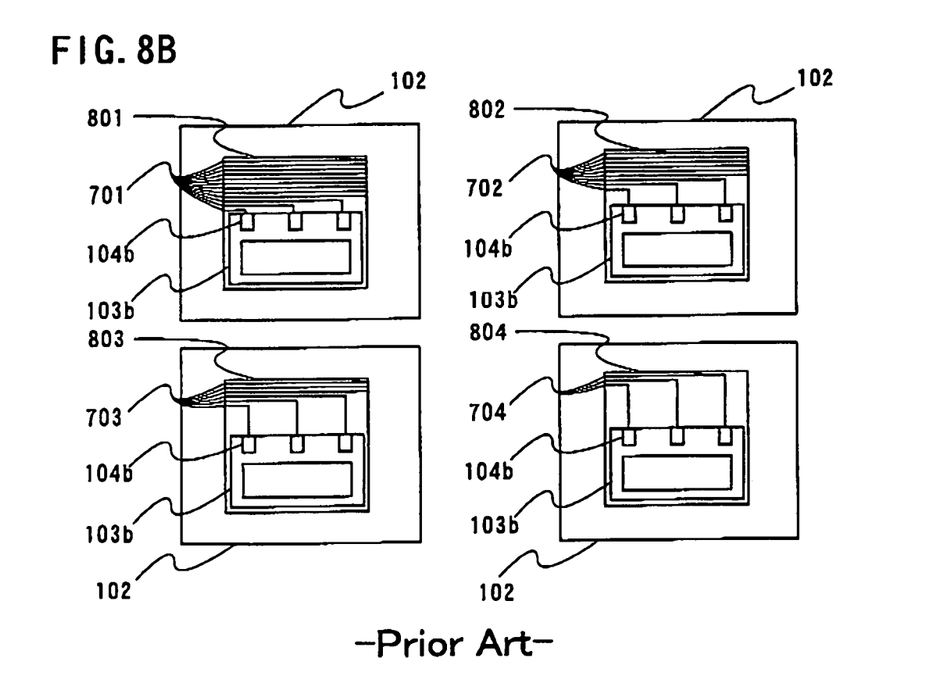

An exposure pattern as shown in FIG. 8A can also be obtained according to the second exposure method. Specifically, the exposure pattern is sequentially exposed to light through a plurality of reticles 102 each provided with an exposure unit Dis+BB 801, an exposure unit Dis+BC 802, an exposure unit Dis+BD 803, and an exposure unit Dis+BE 804 including a divided wiring pattern BB 701, a divided wiring pattern BC 702, a divided wiring pattern BD 703, and a divided wiring pattern BE 704 respectively in combination with the display device pattern 103*b* as shown in FIG. 8B.

In either method, there are some disadvantages such as increase in the exposure time and the number of reticles which affect directly the productivity. As a result, there has been a problem that the productivity is reduced in forming the wiring pattern led out from the input terminals to the edge of the substrate to be processed as compared to in forming only the display device on the substrate to be processed.

In view of the foregoing, the present invention will provide a method for efficiently forming a wiring pattern led out from input terminals, which are formed on the periphery of the display device to prevent electrostatic breakdown, to the edge of a substrate to be processed by using the novel configuration and method.

SUMMARY OF THE INVENTION

According to the present invention, a plurality of display devices formed on a substrate to be processed and wiring patterns led out from signal input terminals of the display devices to the edge of the substrate to be processed are obtained by sequentially exposing the substrate to be processed to light through a reticle including a display device pattern and a part of wiring patterns. The number of exposure operations is the same as that of the alignment of the display devices.

In such a manner, a plurality of display devices formed on a substrate to be processed and wiring patterns led out from signal input terminals of the display devices to the edge of the substrate to be processed are obtained without increasing the exposure time and reducing the productivity.

According to the present invention, the signal input terminals are easily switched between in a short circuited state and a non-short circuited state depending on the states of the wiring patterns, which are led out from the signal input terminals of display devices to the edge of the substrate to be processed, with respect to contact and non-contact with a detachable and conductive component.

Accordingly, both a circuit test and a measure against electrostatic breakdown are achieved in the display devices, it is thus possible to improve the yield.

DETAILED DESCRIPTION OF THE PREFERRED EMBODIMENTS

An embodiment mode of the present invention will be hereinafter described. A method for manufacturing a semiconductor device of the invention is explained with reference to FIGS. 9, 10A and 10B. A display device is taken as an example of the semiconductor device herein, and a process of manufacturing a plurality of display devices on a substrate to be processed is explained for instance.

Figure 9:
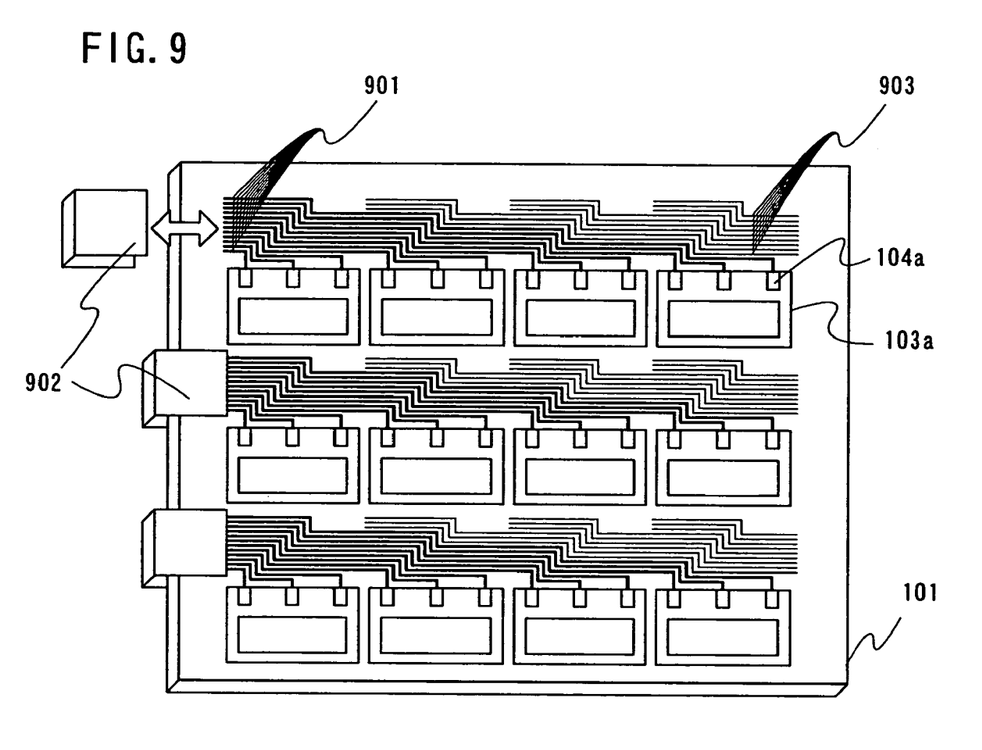
FIG. 9 is a view showing a method of short circuiting between wirings for short circuit and terminals formed by sequentially exposing according to the present invention.

A substrate to be processed 101 is used for manufacturing an active matrix display device integrated with a peripheral circuit. On the substrate to be processed 101, formed are a plurality of arranged active matrix display devices 103a and a lead-out wiring group 901 which is a wiring pattern led out from signal input terminals 104a to the edge of the substrate to be processed 101. A conductive component 902, which has contact with the lead-out wiring group 901 on the edge of the substrate to be processed 101, is detachable and provided to short circuit each signal input terminal 104a.

A manufacturing method of a display device according to the present invention is described. By using this method, the lead-out wiring group 901 placed on the periphery of the display device can be efficiently formed on the substrate to be processed 101 and each signal input terminal can be short circuited both before and after a circuit test to take a measure against electrostatic breakdown.

TFTs or the like constituting the active matrix display device and the lead-out wiring group 901 are formed on the substrate to be processed 101 and have a laminated structure formed by repeating deposition and patterning of each layer.

A reticle is prepared for forming a pattern of each layer constituting the active matrix display device and the lead-out wiring group 901. The substrate to be processed is sequentially exposed to light through an exposure unit formed on the reticle for each layer by the step-and-repeat exposing method, and then the active matrix display device and the lead-out wiring group 901 are obtained.

A layout method for the reticle used for forming the lead-out wiring group 901 will be described hereinafter with reference to FIGS. 10A and 10B.

On a reticle 102, laid out is an exposure unit Dis+R 1006 including the display device pattern 103b and a repetitive wiring pattern group R 1001 used for forming the lead-out wiring group 901 by repetition of exposure.

Figure 10A:
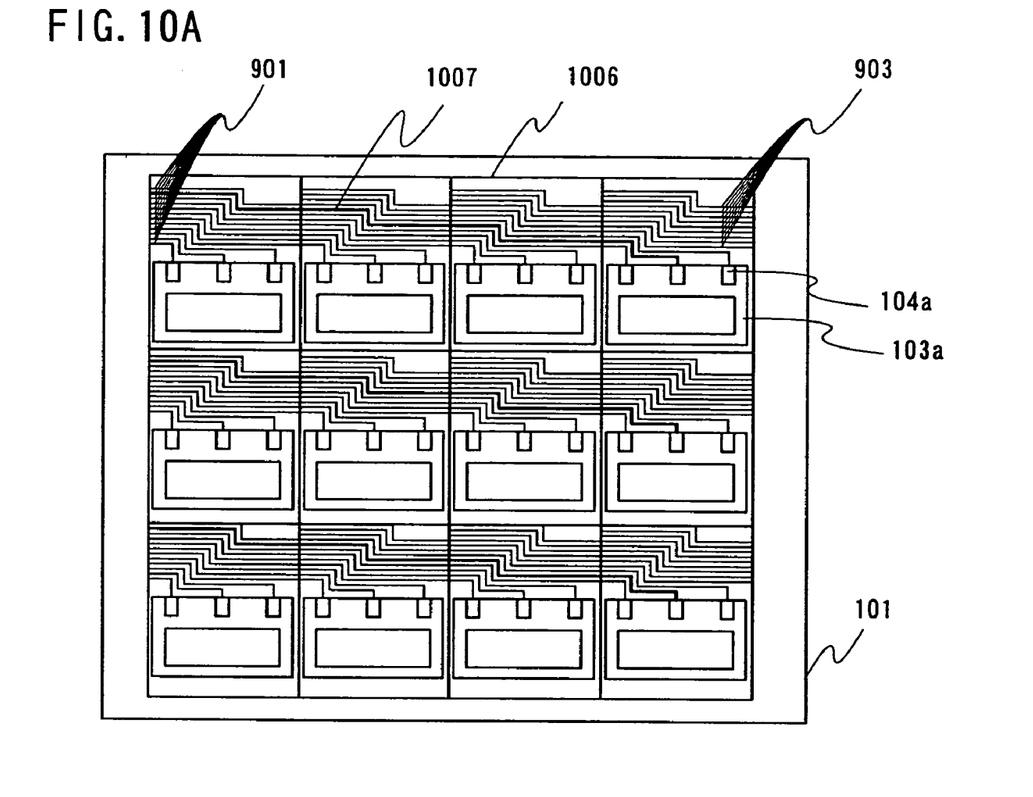
FIGS. 10A and 10B are views showing a process of sequentially exposing a substrate to be processed through a pattern including a wiring pattern for short circuit.
Figure 10B:
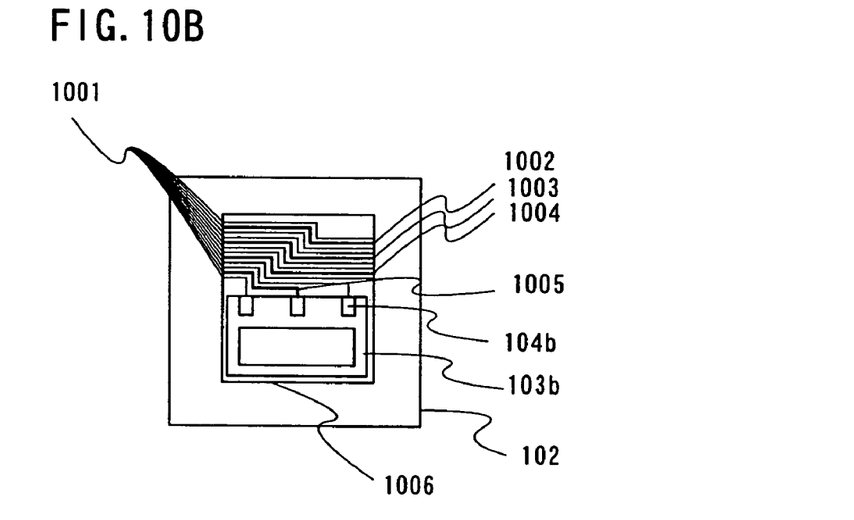

The repetitive wiring pattern group R 1001 is laid out so as to be connected to each other to form the lead-out wiring group 901 while sequentially arranging the exposure unit Dis+R 1006 as shown in FIG. 10A. That is, a repetitive wiring pattern RA 1002, a repetitive wiring pattern RB 1003, a repetitive wiring pattern RC 1004, and a repetitive wiring pattern RD 1005 included in the repetitive wiring pattern group 1001 are connected to each other when sequentially exposing the exposure unit Dis+R 1006 as shown in FIG. 10A, and then a lead-out wiring RA+RB+RC+RD 1007 is obtained. Other repetitive wiring patterns in the repetitive wiring pattern group R 1001 are laid out in the same manner.

Explanation will be hereinafter made on a method of forming the display device 103a and the lead-out wiring group 901 by using the reticle described above and the step-and-repeat exposing method.

By using the step-and-repeat exposing method, the substrate to be processed 101 is repeatedly exposed through the exposure unit Dis+R 1006 to have the arrangement as shown in FIG. 10A. As a result, on the substrate to be processed 101, formed are the display device 103a and the lead-out wiring group 901 which is formed by connecting the repetitive wiring pattern groups R 1001 to each other. That is, by repeatedly exposing the substrate to be processed 101 through the exposure unit Dis+R 1006 shown in FIG. 10B to have the arrangement shown in FIG. 10A, the repetitive wiring pattern RA 1002, the repetitive wiring pattern RB 1003, the repetitive wiring pattern RC 1004, and the repetitive wiring pattern RD 1005 are connected to each other to form the repetitive wiring RA+RB+RC+RD 1007.

Lead-out wiring patterns other than the lead-out wiring RA+RB+RC+RD 1007 in the lead-out wiring group 901 are also formed by connecting the repetitive wiring patterns to each other.

Wiring patterns, which are formed by connecting the repetitive wiring pattern groups R 1001 to each other but are not connected to the signal input terminals of the display device as shown in FIG. 10A, make a by-product wiring group 903 formed incidentally in the process of forming the lead-out wiring group 901. The by-product wiring group 903 has no specific role.

In such a manner, a plurality of display devices and the lead-out wiring group 901 led out from the signal input terminals of each display device to the edge of the substrate to be processed can be obtained with the same number of exposure times as the case in which only a plurality of display devices are formed on the substrate to be processed.

Note that, although the lead-out wiring group 901 is preferably formed by using the layers forming the wiring patterns of a display device, the present invention is not limited to this. The lead-out wiring group 901 may also be formed by using the layers forming gate electrodes of TFTs depending on the process and the structure of display device.

Explanation will be hereinafter made on a method of easily switching the signal input terminals between short circuited state and non-short circuited state.

After the process of manufacturing the lead-out wiring group 901, the conductive component 902 shown in FIG. 9 is brought into contact with the lead-out wiring group 901 to short circuit the signal input terminals of each display device. Thereafter, processes are continued with the conductive component 902 attached to the edge of the substrate to be processed 101.

In testing circuits, the conductive component 902 is detached from the edge of the substrate to be processed 101 to make the signal input terminals of each display device free of short circuits, and then, the circuit test of the active matrix display device is performed.

The conductive component 902 is again brought into contact with the lead-out wiring group 901 after the circuit test to short circuit the signal input terminals of each display device, then, subsequent processes and transport of the substrate to be processed are continued.

By using the novel configuration and method as described above, the lead-out wiring group 901 placed on the periphery of the display device and led out from the signal input terminals for preventing electrostatic breakdown to the edge of the substrate to be processed can be efficiently formed on the substrate to be processed 101 and the signal input terminals can be short circuited after the circuit test following TFT forming to take a measure against electrostatic breakdown.

In this embodiment mode, a display device was taken for an example of a semiconductor device using TFTs and a manufacturing method thereof was described, however, the manufacturing method may be applied to forming a CPU and a memory or the like.

The present invention will prevent electrostatic breakdown both before and after a circuit test without reducing the productivity, and thus the yield can be improved.

What is claimed is:

1. A manufacturing method of a display device comprising:
    forming a first display device pattern and a first wiring pattern over a substrate by exposing the substrate to light through a reticle;
    forming a second display device pattern and a second wiring pattern over the substrate by exposing the substrate to light through the same reticle,
    wherein the first and the second wiring patterns are the same;
    wherein the first and the second wiring patterns are electrically connected;
    wherein the first and second wiring patterns are led out from a signal input terminal of the first display device pattern and the second display device pattern to an edge of the substrate; and
    separating the plurality of display devices into individual display devices.

2. A manufacturing method of a display device according to claim 1, wherein the display device includes a plurality of TFTs.

3. A manufacturing method of a display device comprising:
    forming a plurality of display devices over a substrate to be processed;
    forming a wiring led out from a signal input terminal of each display device on the edge of the substrate to be processed;
    bringing a detachable and conductive component into contact with the wiring on the edge of the substrate to be processed;
    detaching the conductive component from the wiring; and
    separating the plurality of display devices into individual display devices.

4. A manufacturing method of a display device according to claim 3,
    wherein the conductive component makes signal input terminals of the display devices short circuited to each other by having contact with the wiring on the edge of the substrate to be processed.

5. A manufacturing method of a display device according to claim 3,
    wherein the display device includes a plurality of TFTs.

6. A manufacturing method of a display device comprising:
    forming a plurality of display devices over a substrate to be processed;
    forming a wiring led out from a signal input terminal of each display device to the edge of the substrate to be processed,
    wherein the wiring is formed by exposing to light through a repetitive pattern including a wiring pattern integrated with a display device pattern;
    bringing a detachable and conductive component into contact with the wiring on the edge of the substrate to be processed;
    detaching the conductive component from the wiring; and
    separating the plurality of display devices into individual display devices.

7. A manufacturing method of a display device according to claim 6,
    wherein the conductive component makes signal input terminals of the display devices short circuited to each other by having contact with the wiring on the edge of the substrate to be processed.

8. A manufacturing method of a display device according to claim 6,
    wherein the display device includes a plurality of TFTs.

9. A manufacturing method of a display device comprising:
    forming a first display device pattern and a first wiring pattern over a substrate by exposing the substrate to light through a reticle;
    forming a second display device pattern and a second wiring pattern over the substrate by exposing the substrate to light through the same reticle,
    wherein the first and the second wiring patterns are the same,
    wherein the first and the second wiring patterns are electrically connected; and
    separating the plurality of display devices into individual display devices.

10. A manufacturing method of a display device according to claim 9,
    wherein the display device includes a plurality of TFTs.

* * * * *